United States Patent
Bannon et al.

(10) Patent No.: US 9,267,384 B2
(45) Date of Patent: Feb. 23, 2016

(54) FLYWEIGHT FOR RAM AIR TURBINE

(75) Inventors: David G. Bannon, Rockford, IL (US); David L. Jacques, Caledonia, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 882 days.

(21) Appl. No.: 13/410,351

(22) Filed: Mar. 2, 2012

(65) Prior Publication Data
US 2013/0230401 A1 Sep. 5, 2013

(51) Int. Cl.
*F01D 7/02* (2006.01)
*B64D 41/00* (2006.01)

(52) U.S. Cl.
CPC ............... *F01D 7/02* (2013.01); *B64D 41/007* (2013.01); *Y10T 29/49229* (2015.01)

(58) Field of Classification Search
CPC ......... F01D 7/02; B64D 41/00; B64D 41/007
See application file for complete search history.

(56) References Cited

U.S. PATENT DOCUMENTS

| | | | |
|---|---|---|---|
| 3,013,613 A * | 12/1961 | Blackburn | ........................ 416/50 |
| 4,411,596 A | 10/1983 | Chilman | |
| 5,820,074 A | 10/1998 | Trommer et al. | |
| 6,127,758 A | 10/2000 | Murry et al. | |
| 7,077,631 B2 | 7/2006 | Eccles et al. | |
| 7,197,870 B2 | 4/2007 | Bannon | |
| 7,296,970 B2 | 11/2007 | Bannon et al. | |
| 7,410,344 B2 | 8/2008 | Seidel et al. | |
| 7,416,392 B2 | 8/2008 | Russ | |
| 7,419,357 B2 | 9/2008 | Nohr et al. | |
| 7,982,328 B2 | 7/2011 | Huntemann | |
| 8,066,481 B2 | 11/2011 | Bannon | |
| 2012/0107119 A1* | 5/2012 | Bannon | ..................... F03D 9/00 416/44 |

* cited by examiner

*Primary Examiner* — Richard Edgar
*Assistant Examiner* — Brian O Peters
(74) *Attorney, Agent, or Firm* — Carlson, Gaskey & Olds, PC

(57) ABSTRACT

A flyweight for use in a ram air turbine has a body with a circumferentially enlarged portion extending between flat sides spaced by an angle of between 45 degrees and 150 degrees. A pivot point is defined by a bore at a circumferentially intermediate point in the body, and in a relatively thin inner portion. The relatively thin inner portion extends beyond the pivot point to an end that will be radially inward when the flyweight is mounted in a ram air turbine. A governor, a ram air turbine and a method are also described.

4 Claims, 3 Drawing Sheets

FLYWEIGHT FOR RAM AIR TURBINE

BACKGROUND OF THE INVENTION

This application relates to flyweights for ram air turbines utilized on aircraft as a source of supplemental power generation.

Ram air turbines are known, and are movable between a stowed and a deployed position, typically beneath an aircraft. A ram air turbine may be deployed when the main aircraft engine has failed and a source of power is necessary. When deployed, the ram air turbine has blades which are rotatable, and are driven by air rushing past the aircraft. The blades are driven to rotate, and in turn drive a shaft associated with a generator and/or a pump, which generates electricity and/or hydraulic power for various uses on the aircraft, such as providing hydraulic control, or other control to the pilot.

The angle of incidence of the airstream on the turbine blades is desirably changed as the speed of the turbine changes. In the prior art, a governor is associated with a turbine hub, and includes flyweights which shift the governor components during the initial acceleration of the turbine. The flyweights move under centrifugal force to shift the governor components and change the angle of incidence of the airstream on the blades. The prior art flyweights are typically relatively complex, and include a stainless steel component having a pair of spaced blades, and which are riveted through openings in the stainless steel component to a tungsten component.

SUMMARY

A flyweight for use in a ram air turbine has a body with a circumferentially enlarged portion extending between flat sides spaced by an angle of between 45 degrees and 150 degrees. A pivot point is defined by a bore at a circumferentially intermediate point in the body, and is in a relatively thin inner portion. The relatively thin inner portion extends beyond the pivot point to an end that will be radially inward when the flyweight is mounted in a ram air turbine. A governor, a ram air turbine and a method are also disclosed.

These and other features of this invention would be better understood from the following specification and drawings, the following of which is a brief description.

DETAILED DESCRIPTION

Figure 1:
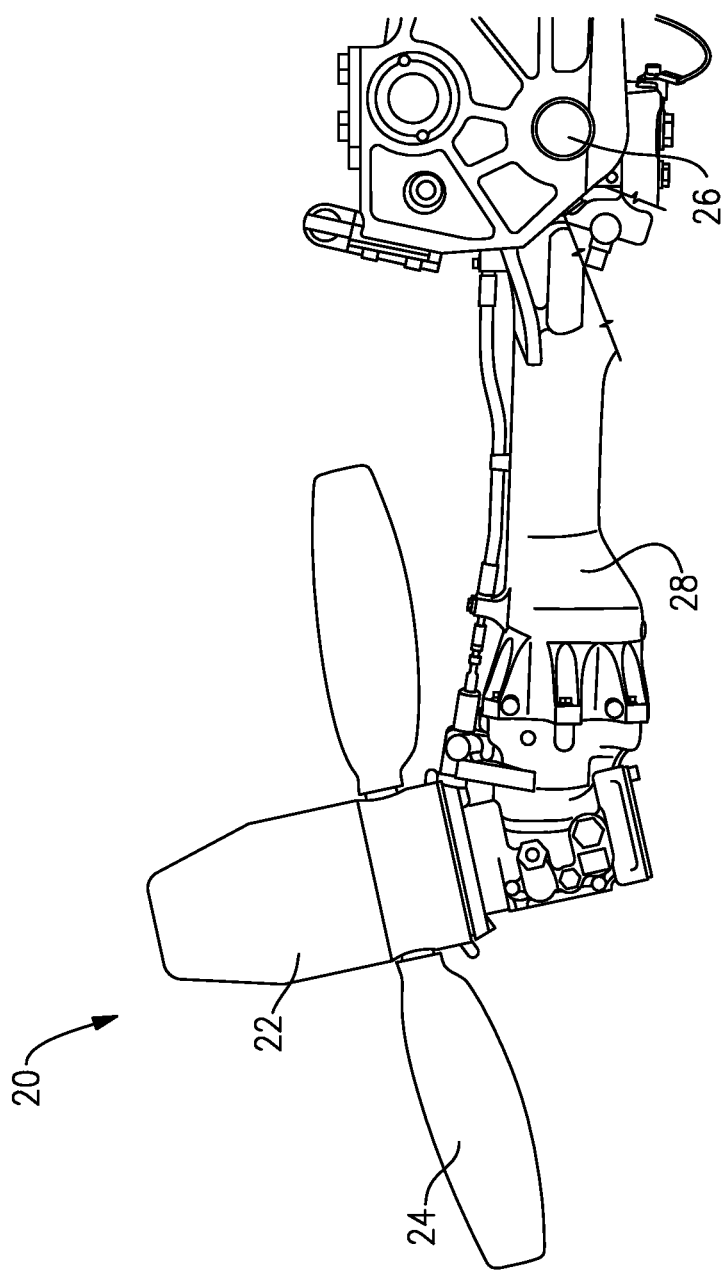
FIG. 1 shows a ram air turbine.

FIG. 1 shows a ram air turbine 20 somewhat schematically. As known, a hub 22 is associated with a plurality of blades 24 which may rotate relative to the hub 22. A pivot point 26 allows the ram air turbine 20 to be stowed within an aircraft, or pivoted downwardly as shown in FIG. 1 to a deployed position. A connection 28 transmits rotation of the blades 24 through a shaft to a generator or pump, as known, where electricity or hydraulic power is generated.

Figure 2:
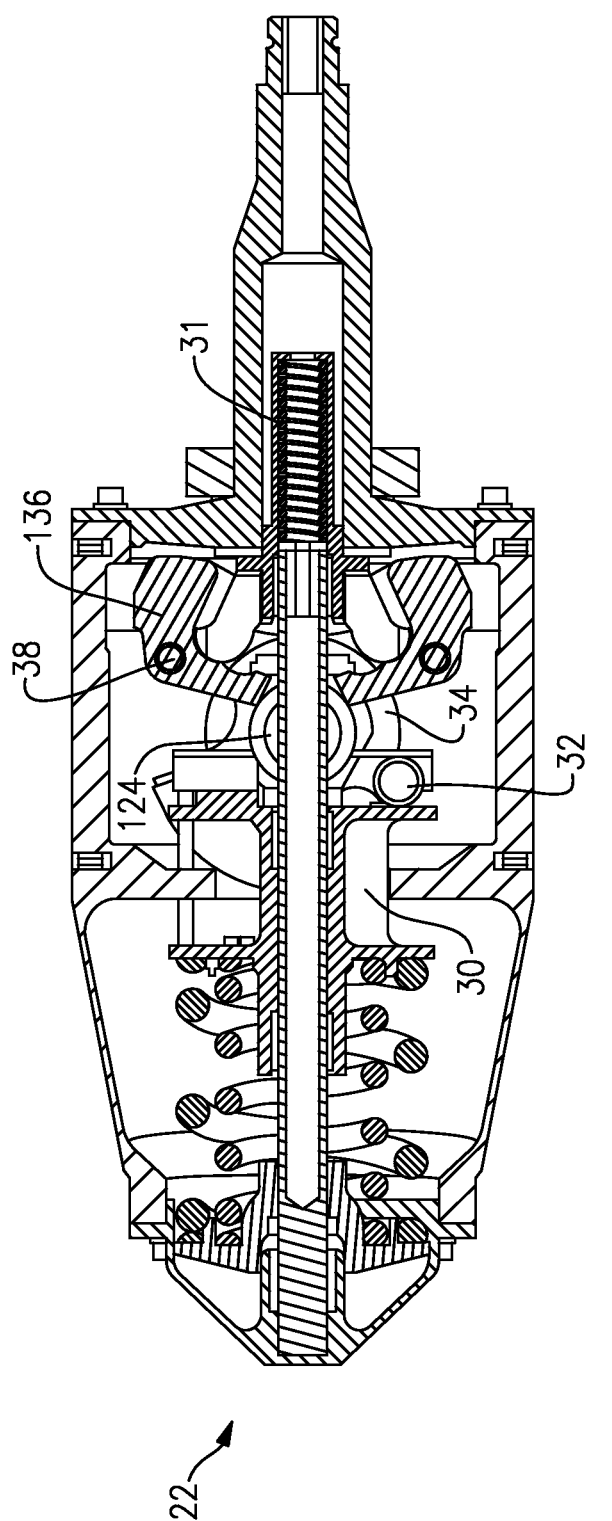
FIG. 2 shows a turbine hub.

FIG. 2 shows details of a hub 22, and in which is deployed a governor which changes the angle of incidence of the blades 24 as the speed of rotation changes. Thus, the blade 24 (see FIG. 1) is shown to have a root 124 which is received to be associated with a hub 34. A yoke plate 30 is biased to the left as shown in this Figure by springs 31. Flyweights 136 are pivotally mounted on pivot pins 38. As the speed of rotation of the hub 22 increases, the flyweights 36 pivot in response to centrifugal force, and cause allow the yoke plate 30 to move to the right as shown in FIG. 2, and against the force of spring 31. With this movement, the yoke plate 30 moves the pin 32 to pivot, causing rotation of the hub 34 and blade root 124, and hence the blade 24. These aspects are as known. Of course, the shape of the flyweight 136 and the location of pivot pins 38 is similar to that shown below with regard to FIG. 6. This shape is not part of the prior art, nor known prior to the filling of the instant application.

Figure 3:
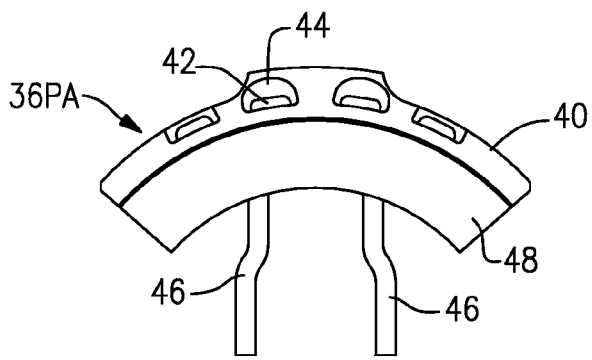
FIG. 3 shows a prior art flyweight.

In the prior art, the flyweight had a relatively complex shape and construction as illustrated in FIG. 3. The Prior Art flyweight 36PA had an inner member with a pair of circumferentially spaced legs 46 associated with a stainless steel member 40. Openings 44 in the stainless steel member 40 received rivets 42 which allow the stainless steel portion to be riveted to a tungsten portion 48. The cost of such a flyweight is unduly high, and assembly is complex.

Figure 4:
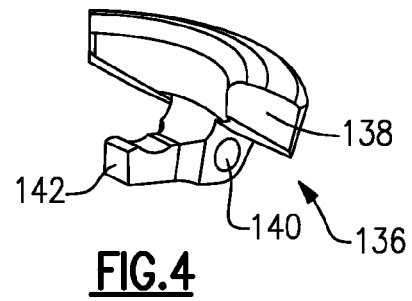
FIG. 4 shows an embodiment of the present flyweight.

FIG. 4 shows a perspective view of a flyweight 136 formed of a single piece of stainless steel. As shown, an enlarged portion 138 is associated with a pivot pin bore 140, and a relatively circumferentially thin single leg 142 extends from enlarged portion 138.

Figure 5:
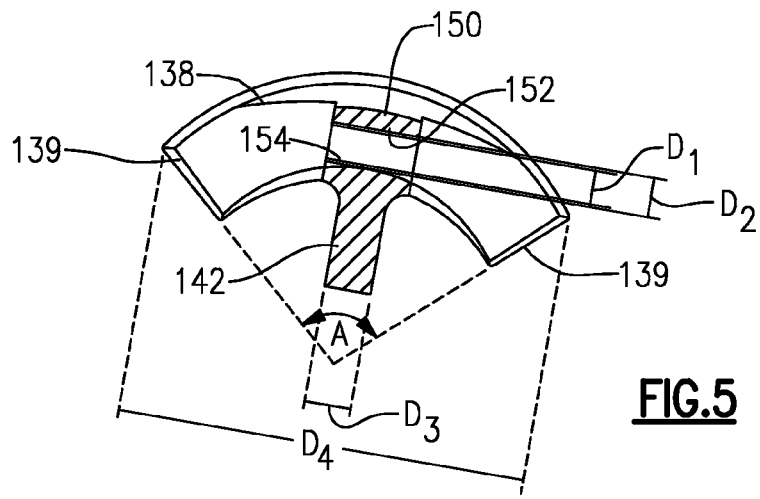
FIG. 5 is another view of the flyweight.

A plan view of flyweight 136 is shown in FIG. 5. The flyweight 136 has a central portion 150 that includes a bore 152 having a diameter $D_2$. A liner 154 is received within the bore 152, and an inner diameter of the liner 154 is $D_1$. In one embodiment, the inner diameter $D_1$ is about 0.378" (about 0.96 cm), and the inner diameter $D_2$ is about 0.436" (about 1.11 cm). In an embodiment, a ratio of $D_1$ to $D_2$ is between approximately 0.95 and approximately 0.50. The liner may be formed of PTFE, e.g. Teflon™.

As further shown in this Figure, the enlarged portion 138 has its outermost ends formed with generally linear edges 139. Notably, the edges are also tapered. A circumferential extent between the opposed edges 139 is at angle A. In an embodiment, the angle A is 110 degrees. But, in other embodiment, the angle A may range between about 45 degrees and about 150 degrees.

Also shown in FIG. 5, the single inner leg 142 extends for a distance $D_3$. The distance $D_4$ to the outermost points of the enlarged portion 138 is $D_4$. In embodiments, $D_3$ is about 0.500" (about 1.27 cm), and $D_4$ is about 4.390" (about 11.15 cm). A ratio of $D_3$ to $D_4$ may range between about 0.10 and about 1.0. The end of the thin inner portion has sides which are parallel to each other, and spaced by a first distance. Planes are defined parallel to the sides of the end of the thin inner portion and extend through the circumferentially outermost ends of the enlarged portion which are spaced by a second distance. A ratio of the first distance to the second distance is between about 1.0 and about 0.25.

Figure 6:
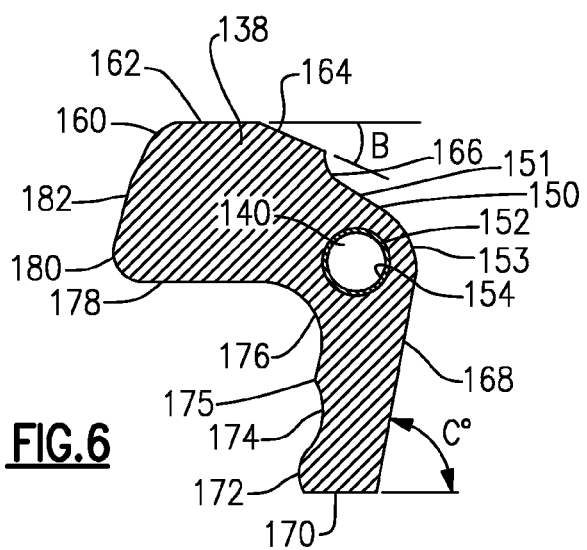
FIG. 6 is a cross-sectional view through the FIG. 5 flyweight.

FIG. 6 shows further features taken along a center of the FIG. 5 cross-section. As shown, the enlarged portion 138 has a curved surface 160 leading into a first flat surface 162. A second flat surface 164 is at an angle B relative to the flat surface 162. In one embodiment, angle B is about 24 degrees. Angle B may range between about 45 degrees and 135 degrees.

Closer to the pivot point 140, a curve surface 166 merges flat surface 164 into another flat surface 151. Flat surface 151 merges into a curve surface 153 which leads to another flat surface 168. Flat surface 168 is at an angle C relative to a bottom flat surface 170. In one embodiment, angle C was 80 degrees. Angle C may range between about 45 degrees and 135 degrees. A curve surface 172 merges from flat surface 170 into a notch 174, also formed on a curve. From notch 174, the profile extends outwardly to a point 175, and then into a second notch 176. Notch 176 curves into a flat surface 178, and flat surface 178 merges into a curve surface 180 which leads into another flat surface 182 leading back into curve surface 160.

A flyweight made according to the teachings of this application is relatively simplified compared to the prior art.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A flyweight for use in a ram air turbine comprising:
a body formed of stainless steel, said body having a circumferentially enlarged portion extending between flat sides at circumferentially outermost ends spaced by an angle of between 45 degrees and 150 degrees;
a pivot point defined by a bore at a circumferentially intermediate point in said body, and said pivot point being in a relatively thin inner portion, and said relatively thin inner portion extending beyond said pivot point to an end that will be radially inward when said flyweight is mounted in a ram air turbine;
wherein said enlarged portion having a first flat surface generally spaced from said bore, and a second flat outer surface extending from said first flat surface, and into a first curved surface, said curve, a surface extending beyond said bore to a third flat surface, said third flat surface extending downwardly to a bottom flat surface, said bottom flat outer surface being at said end of said thin inner portion;
an inner diameter of said liner defines a first diameter, and an inner diameter of said bore is at a second diameter, and a ratio of said first diameter to said second diameter is between 0.95 and 0.50;
wherein said end of said thin inner portion having sides which are parallel to each other, and spaced by a first distance, planes defined parallel to the sides of said end of said thin inner portion and extending through said circumferentially outermost ends of said enlarged portion are spaced by a second distance, and a ratio of said first distance to said second distance being between 1.0 and 0.25;
wherein said enlarged portion having a first flat surface generally spaced from said bore, and a second flat outer surface extending from said first flat surface, and into a first curved surface, said curve, a surface extending beyond said bore to a third flat surface, said third flat surface extending downwardly to a bottom flat surface, said bottom flat outer surface being at said end of said thin inner portion;
wherein said third flat surface extending at an angle relative to said bottom flat surface, with said angle ranging between 45 degrees and 135 degrees;
wherein said bottom flat surface portion extends into a second curved surface and into a first notch extending into said thin inner portion, and said first notch merging into an outermost point, with a second notch extending back inwardly toward said bore from said outermost point; and wherein said second notch extending into a fifth flat surface which extends generally parallel to said first flat surface, and a third curved surface merging from said fifth flat surface to merge an outer surface back into said first curved surface.

2. A governor for a ram air turbine comprising:
a yoke plate operable to move against a spring bias force and cause rotation of a blade root to change an angle of incident of a blade in a ram air turbine;
flyweights for controlling the movement of said yoke plate based upon a rotational speed of a ram air turbine incorporating the governor, said flyweight having a body having a circumferentially enlarged portion extending between flat sides at circumferentially outermost ends spaced by an angle of between 45 degrees and 150 degrees, and a pivot point defined by a bore at a circumferentially intermediate point in said body, and said pivot point being in a relatively thin inner portion, and said relatively thin inner portion extending beyond said pivot point to an end that will be radially inward when said flyweight is mounted in a ram air turbine;
wherein said bore includes a liner;
an inner diameter of said liner defines a first diameter, and an inner diameter of said bore is at a second diameter, and a ratio of said first diameter to said second diameter is between 0.95 and 0.50;
wherein said end of said thin inner portion having sides which are parallel to each other, and spaced by a first distance, planes defined parallel to the sides of said end of said thin inner portion and extending through said circumferentially outermost ends of said enlarged portion are spaced by a second distance, and a ratio of said first distance to said second distance being between 1.0 and 0.25;
wherein said enlarged portion having a first flat surface generally spaced from said bore, and a second flat outer surface extending from said first flat surface, and into a first curved surface, said curve, a surface extending beyond said bore to a third flat surface, said third flat surface extending downwardly to a bottom flat surface, said bottom flat outer surface being at said end of said thin inner portion;
wherein said third flat surface extending at an angle relative to said bottom flat surface, with said angle ranging between 45 degrees and 135 degrees;
wherein said bottom flat surface portion a second curved surface and into a first notch extending into said thin inner portion, and said first notch merging into an outermost point, with a second notch extending back inwardly toward said bore from said outermost point; and
wherein said second notch extending into a fifth flat surface which extends generally parallel to said first flat surface, and a third curved surface merging from said fifth flat surface to merge an outer surface back into said first curved portion.

3. A ram air turbine comprising:
a turbine hub carrying a plurality of blades, said turbine hub being selectively deployable into a location where it will face airflow relative to an aircraft carrying said ram air turbine, and said ram air turbine carrying a governor, the governor having a yoke plate operable to move against a spring bias force and cause rotation of a blade root to change an angle of incident of blades in the ram air turbine;
flyweights for controlling the movement of said yoke plate based upon a rotational speed of the ram air turbine, said flyweight having a body formed of stainless steel, said body having a circumferentially enlarged portion extending between flat sides at circumferentially outermost ends spaced by an angle of between 45 degrees and 150 degrees, and a pivot point defined by a bore at a circumferentially intermediate point in said body, and said pivot point being in a relatively thin inner portion, and said relatively thin inner portion extending beyond said pivot point to an end that is radially inward;

wherein said bore includes a liner;

wherein an inner diameter of said liner defines a first diameter, and an inner diameter of said bore is at a second diameter, and a ratio of said first diameter to said second diameter is between 0.95 and 0.50;

wherein said end of said thin inner portion having sides which are parallel to each other, and spaced by a first distance, planes defined parallel to the sides of said end of said thin inner portion and extending through said circumferentially outermost ends of said enlarged portion are spaced by a second distance, and a ratio of said first distance to said second distance being between 0.10 and 0.25;

wherein said enlarged portion having a first flat surface generally spaced from said bore, and a second flat outer surface extending from said first flat surface, and into a curve, said curve extending beyond said bore to a third flat surface, said third flat surface extending downwardly to a bottom flat surface, said bottom flat outer surface being at said end of said thin inner portion;

wherein said third flat surface extending at an angle relative to said bottom flat surface, with said angle ranging between 45 degrees and 135 degrees;

wherein said bottom flat surface portion communicates with a curved portion and into a first notch extending into said thin inner portion, and said first notch merging into an outermost point, with a second notch extending back inwardly toward said bore from said outermost point; and wherein said second notch extending into a fifth flat surface which extends generally parallel to said first flat surface, and a curve merging from said fifth flat surface to merge an outer surface back into said first curved portion.

4. A method of replacing a flyweight in a ram air turbine comprising the steps of:

inserting a flyweight onto a pivot pin within a governor for the ram air turbine, the flyweight including a body having a circumferentially enlarged portion extending between flat sides spaced by an angle of between 45 degrees and 150 degrees, and a pivot point defined by a bore at a circumferentially intermediate point in said body, and said pivot point being in a relatively thin inner portion, and said relatively thin inner portion extending beyond said pivot point to an end that will be radially inward when said flyweight is mounted in a ram air turbine;

wherein said enlarged portion having a first flat surface generally spaced from said bore, and a second flat outer surface extending from said first flat surface, and into a first curved surface, said curve, a surface extending beyond said bore to a third flat surface, said third flat surface extending downwardly to a bottom flat surface, said bottom flat outer surface being at said end of said thin inner portion;

an inner diameter of said liner defines a first diameter, and an inner diameter of said bore is at a second diameter, and a ratio of said first diameter to said second diameter is between 0.95 and 0.50;

wherein said end of said thin inner portion having sides which are parallel to each other, and spaced by a first distance, planes defined parallel to the sides of said end of said thin inner portion and extending through said circumferentially outermost ends of said enlarged portion are spaced by a second distance, and a ratio of said first distance to said second distance being between 1.0 and 0.25;

wherein said enlarged portion having a first flat surface generally spaced from said bore, and a second flat outer surface extending from said first flat surface, and into a first curved surface, said curve, a surface extending beyond said bore to a third flat surface, said third flat surface extending downwardly to a bottom flat surface, said bottom flat outer surface being at said end of said thin inner portion;

wherein said third flat surface extending at an angle relative to said bottom flat surface, with said angle ranging between 45 degrees and 135 degrees;

wherein said bottom flat surface portion extends into a second curved surface and into a first notch extending into said thin inner portion, and said first notch merging into an outermost point, with a second notch extending back inwardly toward said bore from said outermost point; and wherein said second notch extending into a fifth flat surface which extends generally parallel to said first flat surface, and a third curved surface merging from said fifth flat surface to merge an outer surface back into said first curved surface.

\* \* \* \* \*